United States Patent
Amon et al.

(10) Patent No.: US 6,420,041 B1
(45) Date of Patent: Jul. 16, 2002

(54) FILM WITH METALLIZABLE SKIN LAYER

(75) Inventors: Moris Amon, Pittsford; Eldridge M. Mount, III, Fairport, both of NY (US); Francis Tran, Cumming, GA (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/467,163

(22) Filed: Dec. 20, 1999

(Under 37 CFR 1.47)

(51) Int. Cl.⁷ .......................... B32B 15/08; B32B 27/08
(52) U.S. Cl. ...................... 428/461; 428/484; 428/515; 428/516
(58) Field of Search .................. 428/461, 500, 428/515, 516, 484

(56) References Cited

U.S. PATENT DOCUMENTS

| | | | |
|---|---|---|---|
| 5,153,074 A | | 10/1992 | Migliorini .................. 428/463 |
| 5,192,620 A | | 3/1993 | Chu et al. .................. 428/461 |
| 5,194,318 A | | 3/1993 | Migliorini et al. .......... 428/215 |
| 5,252,384 A | * | 10/1993 | Bothe et al. ................ 428/212 |
| 5,455,111 A | * | 10/1995 | Velasquez Urey ....... 428/315.5 |
| 5,811,185 A | * | 9/1998 | Schreck et al. ............ 428/349 |
| 5,851,610 A | * | 12/1998 | Ristey et al. .............. 428/34.9 |
| 5,925,454 A | * | 7/1999 | Bekele ........................ 428/324 |
| 5,981,079 A | | 11/1999 | Mount et al. ............... 428/461 |
| 6,086,982 A | * | 7/2000 | Peiffer et al. ............... 428/213 |

OTHER PUBLICATIONS

Aldrich Catalog Handbook of Fine Chemicals, p. 637.*

* cited by examiner

Primary Examiner—Paul Thibodeau
Assistant Examiner—Monique R Jackson
(74) Attorney, Agent, or Firm—Dennis P. Santini; Rick F. James

(57) ABSTRACT

A skin layer of a thermoplastic polymer includes an additive to promote metal adhesion to the surface of this layer. This additive is one or more compounds of the formula, R–X, where R is an aliphatic hydrocarbyl group having an average of from 20 to 200 carbon atoms and X is a polar group, such as —COOH or —CH$_2$OH. The film may be biaxially oriented and include a polypropylene core layer. The film may be metallized with an appropriate metal, such as aluminum. A heat sealable skin layer may be provided on the opposite side of the film from the metallizable skin layer.

10 Claims, 1 Drawing Sheet

FILM WITH METALLIZABLE SKIN LAYER

BACKGROUND

This invention relates to a film with a skin layer of a thermoplastic polymer with an additive to promote metal adhesion to the surface of this layer. This additive is one or more compounds of the formula, R–X, where R is a non-polar aliphatic hydrocarbyl group having an average of from 20 to 200 carbon atoms and X is a polar group, such as —COOH or —$CH_2OH$.

Plastic materials such as polymeric films have been widely used for packaging various food and non-food products. In order to ensure proper preservation of products packaged in such polymeric films, it is necessary to provide the films with barriers against transmission of air, moisture, deleterious flavors, etc. Unmodified polymeric films, however, typically lack sufficient gas and moisture barrier characteristics needed for proper packaging requirements. For example, polypropylene films are particularly preferred in the manufacture of packaging films due to their low cost and ease of manufacture. Such films, however, inherently permit the transmission of oxygen and water vapor from the outside of the film to the inside of the package made up of the film. As will be recognized by those skilled in the art, transmission of oxygen and water vapor through food packaging promotes deterioration of the foods packaged therein.

Multi layer polymeric films have been developed having improved gas and moisture barrier characteristics. In particular, it is known that films incorporating poly-vinyl alcohol (PVOH) or ethylene-vinyl alcohol copolymer (EVOH) as a co-extruded or coated outer layer, on which a metal, such as aluminum, is vapor deposited, display outstanding oxygen and moisture barrier properties.

An example of a co-extruded metallizable film with an EVOH skin is described in U.S. Pat. No. 5,153,074. In particular, an EVOH layer is applied to a surface of a polymer substrate layer, which includes a maleic acid anhydride modified propylene homopolymer.

U.S. Pat. No. 5,192,620 discloses an oriented polypropylene base layer having a coating on one surface of a blend of a vinyl alcohol homopolymer or copolymer and an ethylene-acrylic acid copolymer, with a further metal layer thereon. Films incorporating ethylene-vinyl alcohol as co-extruded or coated layers, however, are difficult and expensive to manufacture.

U.S. Pat. No. 5,194,318, the disclosure of which is incorporated herein by reference, discloses a metallized oriented thermoplastic film combination having a propylene homopolymer or copolymer substrate with a high density polyethylene skin layer on at least one side of the substrate. The high density polyethylene skin layer is further covered by a thin metal layer which has been vapor deposited thereon. In one embodiment, the high density polyethylene skin layer is flame or corona discharge treated, and the metal coating is thereafter deposited onto the flame or corona discharge treated layer. Although films which incorporate a high density polyethylene skin do not suffer from the deleterious effects of metal pick off, such films do not provide oxygen and water vapor barrier properties as good as those of films with EVOH or PVOH skins.

U.S. Pat. No. 5,981,079 describes a multi layer film having enhanced barrier properties against transmission of oxygen and water vapor. The multi layer film includes a polypropylene base layer, with a high density polyethylene layer on at least one surface of the polypropylene base layer. The polyethylene layer includes a surface which has been subjected to plasma treatment with a hydroxyl-donating material such as a methanol. The film further includes a metal layer deposited on the plasma treated surface, such as a layer of vacuum deposited aluminum.

A need exists for a packaging film which is simple and inexpensive to manufacture and which is capable of providing enhanced barrier properties to oxygen and water vapor transmission at low manufacturing cost.

SUMMARY

There is provided a multi layer film comprising:
(a) a core layer comprising a thermoplastic polymer; and
(b) at least one metallizable skin layer comprising a non-polar thermoplastic polymer and at least one metal adhesion promoting compound of the formula R–X, where R is a non-polar aliphatic hydrocarbyl group having an average of from 20 to 200 carbon atoms and X is a polar group.

DETAILED DESCRIPTION

Figure 1:
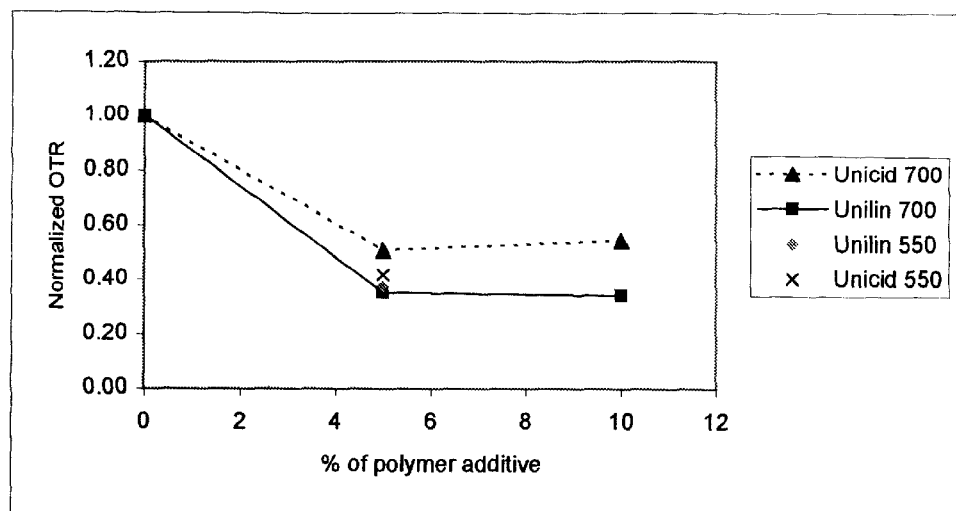
FIG. 1 is a graph showing improved oxygen barrier properties for metallized films including the present metal adhesion promoting additives.

Without being bound by any theory or belief herein, the following theory is offered as a means of better describing the present inventive concepts. It is theorized that the present invention results in raised concentration of desirable polar groups at the surface of the metallizable skin layer by adding the present adhesion promoting additive to the polymer of the skin layer. For the purposes of this theory, this additive may be described as a mostly non-polar polymer or oligomer strategically incorporating a polar group, and this additive has the following two chemical characteristics: (1) the polar group is positioned at one or more terminal locations on a backbone chain or side branches; and (2) the molecular weight of the additive is low enough to provide sufficiently rapid migration of the polar end group towards the surface of the skin layer but high enough to anchor the chain in the matrix once the end group gets to the surface.

The terminal location of the polar group is believed to ensure that it can protrude from the surface. It is further theorized that the driving force for the migration of the additive towards the surface comes in part from the chemical incompatibility between its polar group and the matrix polymer. There may be additional incompatibility between the non-polar chain of the additive and the matrix, but it is believed that this additional incompatibility must be held under control. Otherwise, the additive will entirely exude to the surface and form a weak boundary between the main polymer and deposited metal.

The terminal polar group, X, may be a substituted hydrocarbyl group having 10 or less carbon atoms. In particular, the hydrocarbyl group may be substituted with one or more heteroatoms, such as O, N and halo (e.g., Cl). These heteroatoms may be covalently bonded to carbon atoms by single, double or triple covalent bonds, depending, of course, on the ability of the heteroatoms to bond with carbon in such a manner. The substituted hydrocarbyl group may be a methyl group (—$CH_3$) with one, two or three of the hydrogen atoms thereof being substituted with one or more heteroatoms. These heteroatoms may be, in turn, substituted with other atoms, especially hydrogen atoms.

Examples of the terminal polar group X include hydroxymethyl (—CH$_2$OH), carboxyl (—COOH), aminomethyl (—CH$_2$NH$_2$), amide (—CONH2), nitrile (—CN), and mono-, di- or tri-chloromethyl (—CCl$_n$H$_{3-n}$, where $1 \leq n \leq 3$).

The non-polar aliphatic hydrocarbyl group, R, has an average of from 20 to 200 carbon atoms, for example, 40 to 60 carbon atoms. The group R may be (1) substituted or unsubstituted, (2) saturated or unsaturated and (3) straight-chained (i.e. linear) or branched-chained. Preferably, R is both unsubstituted and saturated, of the formula, —C$_m$H$_{2m+1}$, where $20 \leq m \leq 200$, especially when chosen to mimic a polyolefin skin layer, such as a skin layer of linear polyethylene.

At least 90% of the R groups may fall within the range of 20 to 200 carbon atoms, with 10% or less of these groups falling outside of this range, i.e. less than 20 carbon atoms or greater than 200 carbon atoms.

A particular example of a composition, R–X, where X is —CH$_2$OH, is UNILIN 700®, available from Baker Petrolite Corporation, Polymers Division, 6910 E. 14$^{th}$ Street, Tulsa Okla., 74112. According to Baker's Technical Release 2000, UNILIN 900® is a primary, linear, saturated, polymeric alcohol. The number average molecular weight is about 700, corresponding to R=C$_{48}$H$_{97}$. The alcohol content is about 78 mole %, the remainder being linear, aliphatic, saturated hydrocarbon. The polydispersity, quantified by the ratio of weight-average to number-average molecular weight, is about 1.09, indicating a narrow molecular weight distribution.

A particular example of a composition, R–X, where X is —COOH, is UNICID 700®, available from Baker Petrolite Corporation, Polymers Division Headquarters, 6910 E. 14$^{th}$ Street, Tulsa Okla., 74112. According to Baker's Developmental Release DR0007, UNICID 700® is a primary, linear, saturated, polymeric carboxylic acid. The number-average molecular weight is about 700, corresponding to R=C$_{47}$H$_{95}$. The acid number is 63 mg KOH/g, from which an acid content of 78 mole % is calculated, the remainder being linear, aliphatic, saturated hydrocarbon. The polydispersity is expected to be similar to UNILIN 700®.

The amount of R–X included in the metallizable skin layer should be an amount sufficient to promote metal adhesion to the layer. For example, this amount may be 0.1 to 25 wt % or more likely, 1 to 10 wt %, based on the weight of thermoplastic polymer in the skin layer.

The metallizable skin layer(s) also comprise a non-polar polymer matrix. Suitable polymers include an olefinic homopolymer, such as polypropylene or polyethylene. Other suitable polymers include a copolymer of two or more olefins or a blend of any number of the foregoing olefin polymers. Particular skin layers comprise a linear ethylene homopolymer having a density of about 0.96 g/cm$^3$, and a propylene-butylene copolymer in which the butylene content is about 4 to about 20 weight %. Although polar polymers, such as polyamides and polyesters are not excluded, they are expected to benefit minimally from the present invention.

The core layer comprises a thermoplastic polymer which has properties suitable for extrusion or coextrusion. The extruded or coextruded film may be biaxially oriented in the machine and transverse directions under elevated temperature so as to form a multi-layer film. Although the preferred thermoplastic polymer of the core layer is a polypropylene homopolymer, other polymers, especially polyolefin homopolymers or copolymers, may be used. These polymers include homopolymers and copolymers made from one or more 2- to 8-carbon olefinic monomers, such as ethylene or 1-butene.

The skin layer on the opposite side of the core layer from the metallizable skin layer may be a heat sealable layer, especially heat sealable polyolefinic copolymers and terpolymers and blends thereof. The copolymers include block copolymers, for example of ethylene and propylene, and random copolymers, for example of ethylene and propylene. Terpolymers are exemplified by ethylene-propylene-butene-1 terpolymers. Also, heat sealable blends can be utilized in providing this layer. Thus, along with the copolymer or terpolymer there can be polypropylene homopolymer or other material which does not impair the heat sealability of this layer.

The skin layer on the opposite side of the core layer from the metallizable layer may comprise a polypropylene homopolymer, such as highly crystalline polypropylene (HCPP), which may help to improve release properties of the film. HCPP polypropylene polymers include those having a decalin solubles content of less than about 5% by weight, meso pentads equal to or greater than about 85% ($^{13}$C NMR spectroscopy), and a melt flow of about 2.5 to about 3 (as measured according to the standard ASTM D1238 test for polypropylene). Suitable commercially available HCPP polymers include, but are not limited to, AMOCO 9218® HCPP resin from BP-Amoco.

The multi-layer film may have one or more additional layers, such as a tie layer, in addition to the core and skin layers. It is also possible to have two metallizable skins if vapor deposition on both sides of the film is desired.

Sometimes it is useful to enhance or provide the film with certain properties by use of appropriate film additives. Such additives are used in effective amounts, which vary depending upon the property required, and may be selected from the group consisting of: antistatic, antiblock, slip, or antioxidant additives. These additives may be added to one or more layers of the film according to the present invention.

Either of the skin layers of the film, preferably the non-metallized or sealable layer, can optionally contain a minor amount of antiblock particles, such as clays, talc, glass, and others. One antiblock material can be used alone, or different sizes and shapes can be blended to optimize machinability. The major proportion of the particles, for example, more than half, may be of such a size that a significant portion of their surface area, will extend beyond the exposed surface of such skin layer. Suitable antiblocks include, but are not limited to, fully cross-linked non-meltable polymethyl methacrylate (PMMA) particles, such as EPOSTAR® MA-1002, or silica (SiO$_2$) particles, such as SYLOBLOC 44® from W. R. Grace, or fully cross-linked or non-meltable polysiloxane micro-spheres, such as TOSPEARL T120A®, from Toshiba Silicone Company, Ltd. Partially cross-linked polysiloxane particles, which release non-cross-linked liquid silicone under stress, as described in U.S. Pat. No. 5,840,419, can also be used. The solid antiblock may be incorporated into the layer in an amount ranging from about 0.1 to about 0.5% by weight, preferably from about 0.15 to about 0.30% by weight, based on the entire weight of the layer.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines. The antistatic agent may be glycerol monostearate (GMS) or a blend of GMS and tertiary amine.

Slip additives include higher aliphatic acid amides, higher aliphatic acid esters, waxes and metal soaps, which can be used in amounts ranging from about 0.1 to about 2 weight percent based on the total weight of the layer. A specific example of a fatty amide slip additive is erucamide. Optionally, one or more layers are compounded with a wax for lubricity. Amounts of wax range from about 1 to about 15 weight % based on the total weight of the layer. Waxes and slip additives tend to migrate towards the surface of the film. If, prior to metallization, they migrate to the metallizable surface, or they migrate to the opposite surface and are transferred to the metallizable surface by contact, metal adhesion may be impaired. Therefore, it may be necessary to include such additives in a core or tie layer, and not directly in either of the skin layers, to delay their migration. It may further be necessary to minimize the delay between film manufacture and metallization.

Antioxidants, such as phenolic antioxidants, may be used in amounts ranging from about 0.1 weight % to about 2 weight percent, based on the total weight of the layer. An example of an antioxidant is commercially available under the trademark IRGANOX 1010.

The multi-layer film may also comprise coatings, such as an adhesive layer (e.g., a water-based urethane coating), and/or a cold seal layer (e.g., Technical Coatings 30061A, which is a pattern applied coating comprising polyisoprene and ethylene-vinyl acetate copolymer), as is well known in the art.

The film may be formed by coextruding the thermoplastic polymer-containing core layer together with the at least one skin layer and optional additional layers through a flat sheet extruder die at a temperature ranging from between about 200 to about 275° C., casting the film onto a cooling drum and quenching the film. The sheet may then be stretched about 4 to about 6 times in the machine direction (MD) between rolls, and then stretched about 6 to about 10 times in the transverse direction (TD) in a tenter. Alternatively, the MD and TD stretches may occur more or less simultaneously by means of suitable machinery, such as described in U.S. Pat. No. 4,853,602. The film may then be wound onto a reel. Optionally, one of the external surfaces is coated or flame or corona treated before winding (i.e., the surface of the functional skin layer). In addition, the production process may also include coating an adhesive and/or cold seal layer on one or both surfaces of the multilayer polymeric film.

The core layer may represent about 70 to about 90 percent of the thickness of the total multilayer polymeric film. The skin layers are usually coextensively applied to each major surface of the core layer, typically by coextrusion, as noted above. However, skin layers arrived at by coextrusion may not, ultimately, be the outermost layers.

Metal layers are known in the art, and can be deposited using any known method, for instance, vacuum deposition, electroplating, sputtering, etc. Preferably, the metal layer is one of vacuum deposited aluminum, copper, silver, chromium, gold, and mixtures thereof, with vacuum deposited aluminum being most preferred. A protective acrylic or other polymeric coating may be deposited over the metal layer under vacuum, preferably in the metallization machine, as taught, for example, by U.S. Pat. No. 4,842,893.

A polymeric film may be laminated to the metal layer of the multi layer film to protect the metal from scratching and scuffing during use. Such polymeric film can improve the gauge, stiffness and puncture resistance of the overall film, and can further enhance the barrier properties of the film. The polymeric film can be oriented, unoriented, transparent or opaque. Preferably, the polymeric film is polypropylene or polyethylene, most preferably oriented polypropylene (OPP). Such an additional polymeric film can be laminated to the metal layer using any suitable adhesive. A particularly preferred adhesive is a hot melt low density polyethylene, applied in an amount of about 10 pounds per ream.

The multi layer films of the present invention may have a total thickness of, for example, about 10 to about 50 $\mu$m. The metallizable skin layer may have a thickness of, for example, about 0.5 to about 4 $\mu$m.

EXAMPLES

Films were coextruded to form a three layered A/B/C structure, where layer B is the core layer and layers A and C are skin layers. The films were each stretched 5 times in the machine direction (MD) and 8 times in the transverse (TD) direction.

Metallizable layer A was composed of a mixture of various metal adhesion promoting additives with a polymer identified as SRD4-189®, which is a propene-butene copolymer with 8 wt % 1-butene, available from UNION CARBIDE®. Core layer B was composed of a FINA 3371® polypropylene homopolymer sold by the FINA OIL COMPANY®. Skin layer C was composed of a polymer identified as DS4-D05®, which is a propene-butene copolymer with 14 wt % 1-butene, available from UNION CARBIDE®. Layer A was 1–1.5 $\mu$m thick, layer B was 16 $\mu$m thick, and layer C was 1 $\mu$m thick.

The additive in layer A was UNILIN® 700, UNILIN® 550, UNICID® 700 or UNICID® 550, each available from BAKER PETROLITE CORPORATION®. These additives were used in concentrations of 5 wt %, in the case of all additives, and 10 wt %, in the case of Unilin 700 and Unicid 700. The 700 or 550 suffix indicates a number-average molecular weight. There was a control film with no additive.

After a one-month aging period, the film was aluminized and its oxygen transmission rate (OTR) and water vapor transmission rate (WVTR) were measured by ASTM test methods D3985 and E96, respectively.

Figure 2:
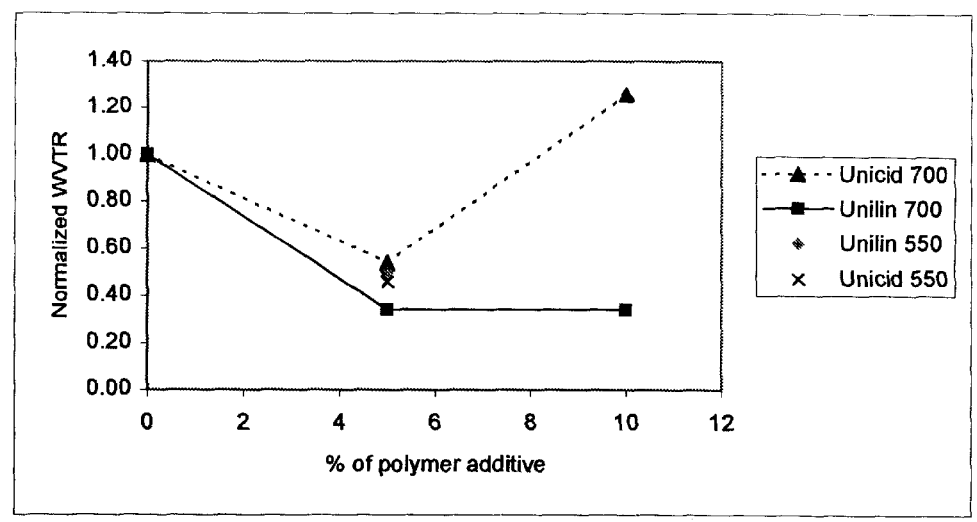
FIG. 2 is a graph showing improved water vapor barrier properties for metallized films including the present metal adhesion promoting additives.

The results are shown in FIGS. 1 and 2. It is seen that both additives can reduce both WVTR and OTR significantly. The benefit of the —OH terminated additive is greater than that of the —COOH terminated one at 700 molecular weight. The difference between —OH and —COOH terminations is negligible at 550 molecular weight and 5% concentration. It is also seen that the full benefit is achieved at 5% concentration for the 700 molecular weight. At 10%, the —COOH terminated additive of 700 molecular weight was observed to be detrimental to WVTR. It is theorized that the higher concentration of the —COOH terminated additive promoted over-exudation of this additive to the surface of the skin layer, possibly due to additive molecules tending to associate with one another, rather than with the polymer matrix.

What is claimed is:

1. A multilayer film comprising:
   (a) a core layer comprising a thermoplastic polymer; and
   (b) a metallized skin layer comprising a non-polar thermoplastic polymer and at least one metal adhesion promoting compound of the formula R–X, where R is an aliphatic hydrocarbyl group having from 36 to 200 carbon atoms and X is a polar group selected from the group consisting of COOH, $CH_2OH$, and mixtures thereof.

2. A film according to claim 1, wherein X is —CH$_2$OH.

3. A film according to claim 1, wherein said non-polar thermoplastic polymer of the skin layer comprises at least one polyolefin homopolymer or copolymer.

4. A film according to claim 3 which is biaxially oriented.

5. A film according to claim 4, wherein said polyolefin in said core layer is polypropylene.

6. A film according to claim 5, wherein said skin layer comprises a copolymer of propylene and butene.

7. A film according to claim 5, wherein said skin layer is metallized with aluminum.

8. A film according to claim 5, wherein said film has a second skin layer and said second skin layer is a heat sealable layer.

9. A film according to claim 1, wherein X is —COOH.

10. A multilayer film comprising:

(a) a core layer comprising a thermoplastic polymer; and (b) a metallized skin layer comprising a non-polar thermoplastic polymer and at least one metal adhesion promoting compound of the formula R–X, where R is an aliphatic hydrocarbyl group having from 40 to 200 carbon atoms and X is a polar group selected from the group consisting of COOH, CH$_2$OH, and mixtures thereof.

* * * * *